United States Patent [19]

Smith

[11] Patent Number: 5,570,265
[45] Date of Patent: Oct. 29, 1996

[54] STATIC DISCHARGERS FOR AIRCRAFT

[75] Inventor: Henry R. Smith, Knightwick, Great Britain

[73] Assignee: HR Smith (Technical Developments) Limited, Herefordshire, England

[21] Appl. No.: 376,086

[22] Filed: Jan. 20, 1995

Related U.S. Application Data

[63] Continuation of Ser. No. 938,379, Aug. 31, 1992, abandoned, which is a continuation-in-part of Ser. No. 472,094, Jan. 30, 1990, abandoned.

[30] Foreign Application Priority Data

Jan. 31, 1989 [GB] United Kingdom ............... 8902084

[51] Int. Cl.$^6$ ....................................................... H05F 3/04
[52] U.S. Cl. .......................... 361/218; 361/212; 361/216; 361/217
[58] Field of Search .................................. 361/212, 213, 361/214, 215, 216, 217, 218, 219, 220, 221, 222; 244/1 A, 1 TD; 174/5 R, 5 SB; 439/92, 101, 108, 34, 829

[56] References Cited

U.S. PATENT DOCUMENTS

| | | | |
|---|---|---|---|
| 2,309,584 | 1/1943 | George | 244/1 A |
| 2,466,024 | 4/1949 | Hall | 361/218 |
| 3,767,971 | 10/1973 | Patrick, Jr. | 361/222 |
| 5,057,028 | 10/1991 | Lemke et al. | 439/101 |
| 5,066,536 | 11/1991 | Cogswell et al. | 428/216 |
| 5,150,786 | 9/1992 | McAllister | 361/212 |

*Primary Examiner*—William M. Shoop, Jr.
*Assistant Examiner*—Peter Ganjoo
*Attorney, Agent, or Firm*—Bauer & Schaffer

[57] ABSTRACT

An elongate member is coupled by a socket at one end to the aircraft surface, whilst a tip forms its other end. The electrical resistivity of the elongate member, tip and coupling is equal to or greater than $10^2$ ohmmeter; and are preferably molded from a high temperature thermoplastics material having an electrical resistivity equal to or greater than $10^{16}$ ohmmeter. The plastics material is selected from the group comprising polyetherimide, polyethersulphone and polyetheretherketone. The material of the tip is provided with an embedded aligned array of carbon or silicone carbide fibers while the other parts of the discharger are loaded with carbon black or coated with the same thermoplastics material loaded with 4% by weight carbon black. The adhesive used to mount the socket has an electrical resistance between 5 to 10K ohms, while that of the socket is between 5 to 10M ohms, that of the elongate member between 20 to 100M ohms, and that of the tip is between 2 to 5 ohms.

12 Claims, 3 Drawing Sheets

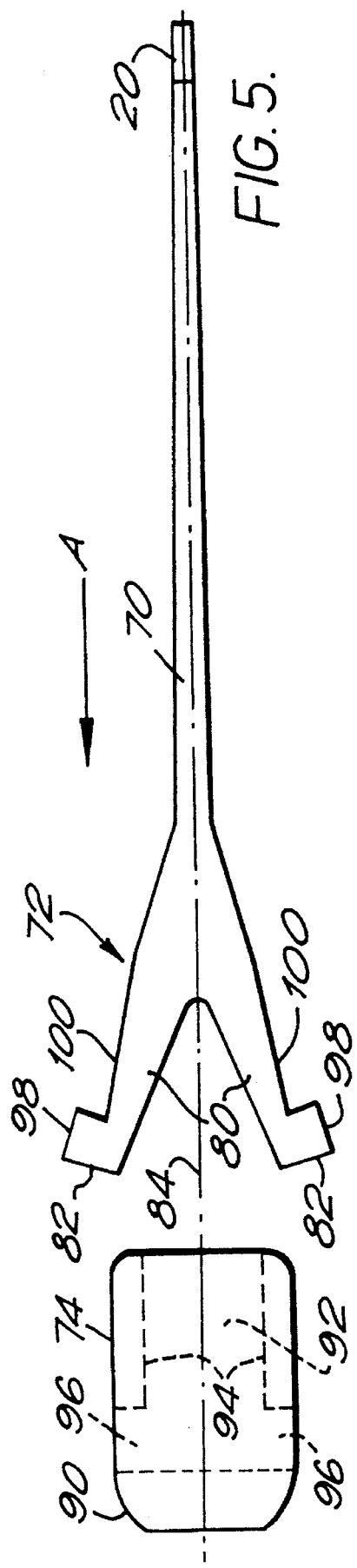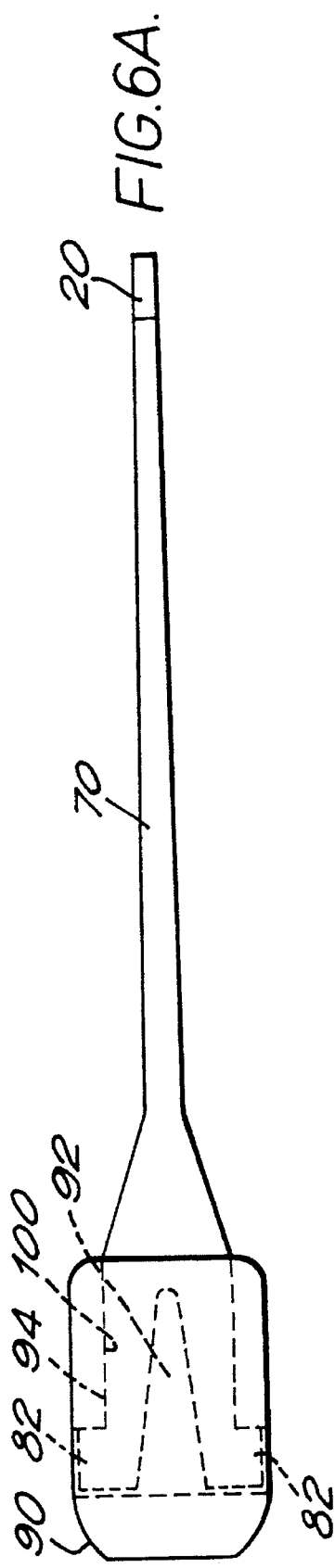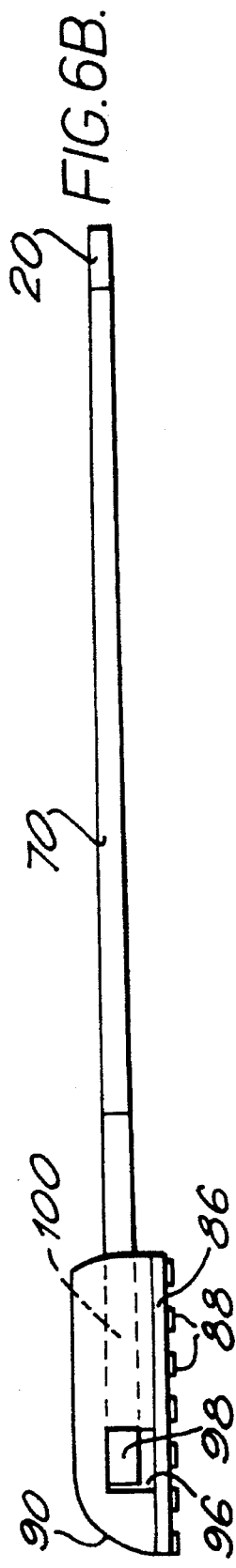

1 …

STATIC DISCHARGERS FOR AIRCRAFT

This is a continuation of Ser. No. 07/938,379, filed Aug. 31, 1992, now abandoned being a continuation-in-part of Ser. No. 07/472,094 filed Jan. 30, 1990, now abandoned.

BACKGROUND OF THE INVENTION

The invention relates to static dischargers for aircraft.

The build up of electrostatic charges on aircraft in flight and the detrimental effects on the performance of avionics systems on board the aircraft caused by the noisy radio frequency emissions due to the uncontrolled electrical discharge of those electrostatic charges is well known.

Different forms of Static discharger have been proposed all of which aim to allow the dissipation of electrostatic charge which build up on an aircraft in a controlled manner thereby minimising this R.F. noise nuisance.

In general these static dischargers comprise slender elongate rods attached at one end to the skin of the aircraft at a point on the air-frame at which it is anticipated an electrostatic charge would normally be dissipated (e.g. on extremities having high voltage potential gradients such as the trailing edges of wings or tail planes of the aircraft). The high curvature free-ends of the discharger permitting any electrostatic charge which has built up in the aircraft to be discharged at a lower potential voltage than would otherwise be the case. In this way the electrostatic charges which build up on an air-frame whilst the aircraft is flying are dissipated with a lower R.F. noise and therefore less interference with the operation of avionics equipment on board. To enhance the operational life of the static discharger the tips are usually of high resistance material—less likely to be destroyed by the electrostatic discharge taking place therefrom—than a low resistivity material.

More recently static dischargers have been proposed in which the tips of the devices comprise a plurality of fine points (e.g. a mass of carbon fibers) increasing the ease with which the electrostatic charge in the air-frame is dissipated and the operational life of the dischargers.

A difficulty found in operation with known dischargers is that when, as happens in normal use an aircraft extremity is struck by lightning, the lightning strike is attracted to the discharger which is often destroyed together with the surrounding part of the air-frame.

All dischargers known to me include metal parts, having a relatively low specific resistivity of $10^{-6}$ ohmmeter or less (see Kaye and Laby, Tables of Physical and Chemical Constants, 15th Edition, Published by Longmans Inc, New York in 1986—at page 117 et seq) to which tips having a higher specific resistivity are coupled whilst other proposals for dischargers which are, for the main part, of non-metallic materials provide that the discharger is coupled to the skin of the aircraft with use of a coupling—usually of metal—having the noted relatively low specific resistivity or that the discharger is coated with an electrically conductive material—a material having the noted low specific resistivity.

These electrically conductive metal parts are provided in the belief that they ease the operation of the discharger—enhancing the travel of electric charge from the aircraft frame to the discharger tip.

It is believed that the incorporation of these parts of relatively low electrical resistivity in the known dischargers is the cause of lightning being attracted to the dischargers—they form an electrically conductive path for the lightning strike to the aircraft frame.

The incorporation of metal parts and/or coatings in the known dischargers has further disadvantages in respect of corrosion effects of the metal/metal junction of the discharger and air-frame—and in respect of weathering effects.

OBJECTS OF THE INVENTION

An object of this invention is the provision of a static discharger in which this disadvantage of the known static dischargers is alleviated or overcome.

Another object of this invention is the provision of a static discharger which is of improved performance compared to the known static dischargers, which is more readily fitted to an aircraft and which moreover may, if mechanically damaged, be more readily replaced than is possible with the static dischargers known to us at present.

Other objects include the provision of static dischargers of reduced weight and drag and which are less likely to be subject to ground handling damage compared with currently available static dischargers.

SUMMARY OF THE INVENTION

In one aspect the invention provides a static discharger for mounting on the surface of an aircraft, which discharger comprises an elongate member of non-metallic material a first end of which is shaped and adapted to be coupled to the surface of the aircraft and the second end of which is formed with an tip member from which electrostatic charge built up on the aircraft on which the discharger is mounted may be discharged, said tip member incorporating a plurality of elements each terminating in a fine point, wherein the electrical resistivity of the elongate member, the tip member and the coupling of the discharger to the skin of the aircraft is equal to or greater than $10^2$ ohm-meter.

The discharger may further comprise a non-metallic attachment socket adapted for adhesive mounting on the surface of an aircraft, wherein said first end of the elongate member is shaped and adapted for coupling to said attachment socket and wherein the electrical resistivity of which socket is equal to or greater than $10^2$ ohm-meter.

The tip member preferably comprises a high temperature thermoplastics material matrix the electrical resistivity of which is equal to or greater than $10^{16}$ ohm-meter and which has embedded therein a plurality of fine carbon or silicon carbide fibers in an aligned array.

The elongate member and the attachment socket are desirably of the same thermoplastics material as the tip member, and wherein said elongate member and said attachment socket are coated with the same thermoplastics material loaded with 4% by weight carbon black.

With advantage the high temperature thermoplastics material of the tip member, elongate member and attachment socket is selected from the group comprising polyetherimide, polyethersulphone, polyetherethersulphone, and polyetheretherketone.

The resistance of the discharger may vary along the length thereof.

The resistance of any adhesive used to mount the attachment socket on an aircraft is preferably in the range 5–10K ohms; the resistance of the attachment socket is preferably in the range 5–10M ohms; the resistance of the elongate member is preferably in the range 20–100M ohms; and the resistance of the tip is preferably in the range 2–5 ohms.

The attachment socket may be provided with a bore in which said first end of the elongate member is received and fixed to hold the elongate member in use.

The elongate member is preferably resilient and the first end thereof in the form of a hook, the elongate member being shaped and sized such that said first end thereof may be passed from one end to the other of the said bore to a position at which said hook member engages a surface of the attachment socket adjacent said other end of the bore to retain the elongate member in position.

The bore of the attachment socket may in one embodiment be open and be provided in a first part of the socket upstanding from a base plate of the socket the socket being provided with a further upstanding part spaced from the said one other of the open bore by an amount permitting the fixing of the elongate member to the socket, the further upstanding part being shaped to decrease the resistance of airflow across the static discharger. The elongate member may in this embodiment be resilient and the first end thereof be in the form of two hook members, the elongate member being shaped and sized such that said first end thereof may be passed from one end to the other of the said bore to a position at which each hook member engages a respective surface of the attachment socket adjacent said other end of the bore to retain the elongate member in position.

The bore of the attachment socket may be provided in a part of the socket upstanding from a base plate of the socket and terminates in a cavity within the attachment socket and which in use receives each hook member. Said cavity may with advantage comprise a further bore running orthogonally of the first said bore such as to enable access to be made to the or each hook member of the first end of the elongate member to enable the release of the elongate member from the attachment socket.

The said bore may be blind and threaded and the first end of the elongate member may also be threaded so as to enable the screw threaded engagement of the elongate member in the bore.

BRIEF DESCRIPTION OF THE DRAWINGS

The above and other aspects features and advantages of the invention will become apparent from the following description of a static discharger embodying the invention made with reference to the accompanying drawings in which:

FIG. 5 is a plan view illustrating another alternative way of coupling the parts of the static discharger together, prior to assembly of the discharger, and, FIG. 6 shows that A and B plan and side views respectively of the alternative coupling method shown in FIG. 5, after assembly of the discharger.

DESCRIPTION OF PREFERRED EMBODIMENTS

Figure 1A:
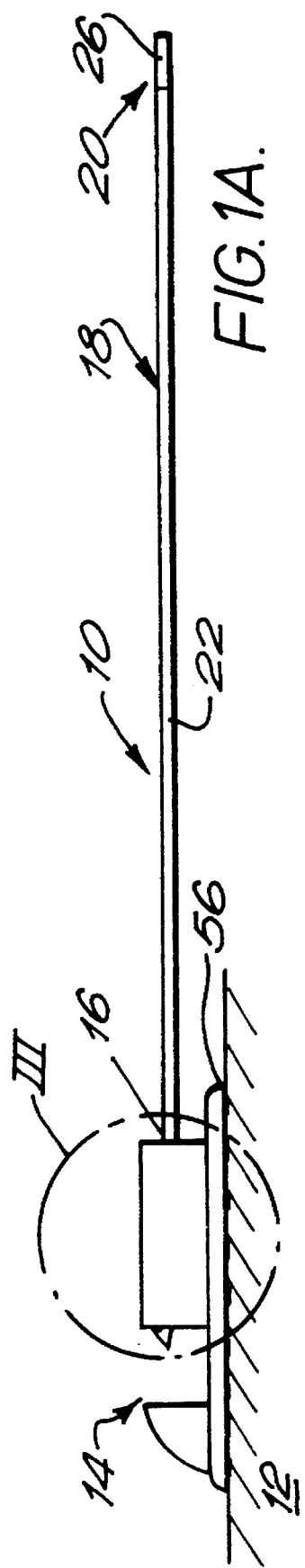
FIG. 1 shows at A, B and C side, plan and underneath plan views respectively of a static discharger mounted on an aircraft.
Figure 1B:
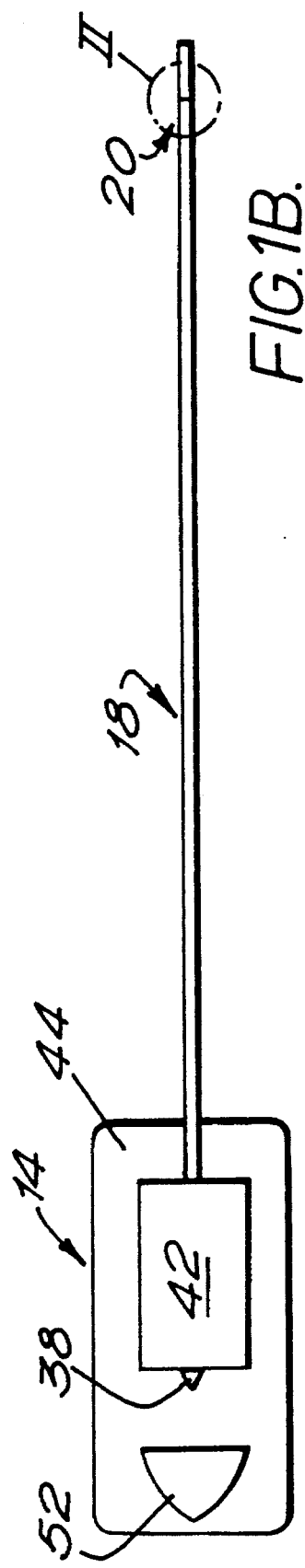
Figure 1C:
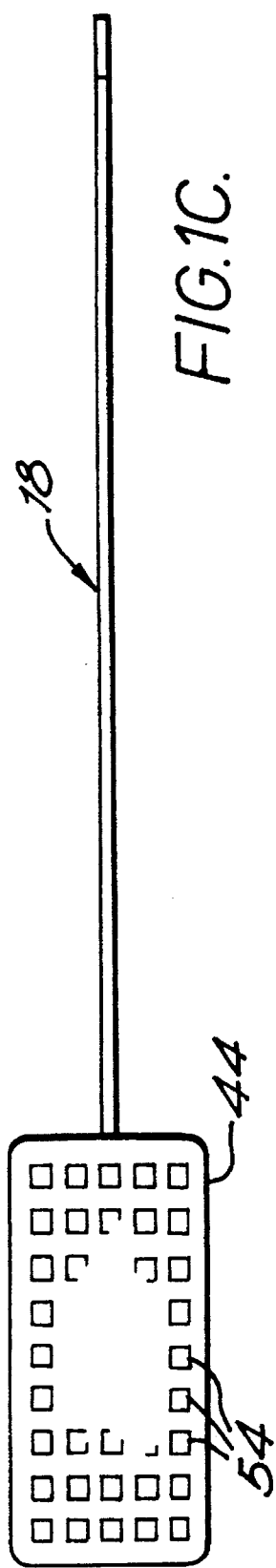
Figure 2:
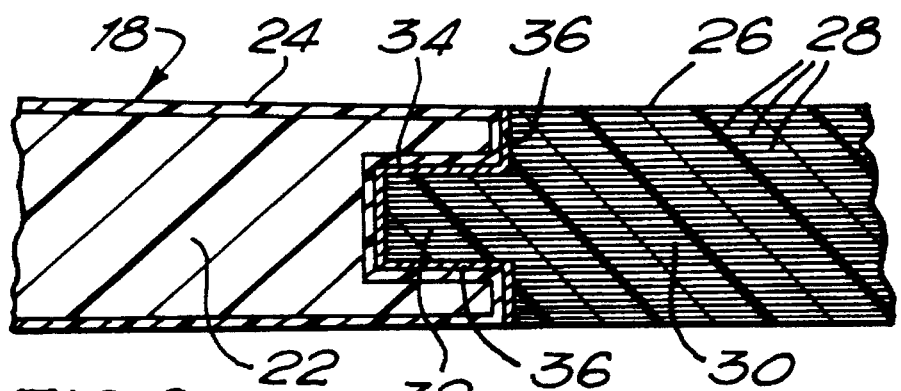
FIG. 2 is an enlarged sectional view of the tip end of the static discharger of FIG. 1.
Figure 3:
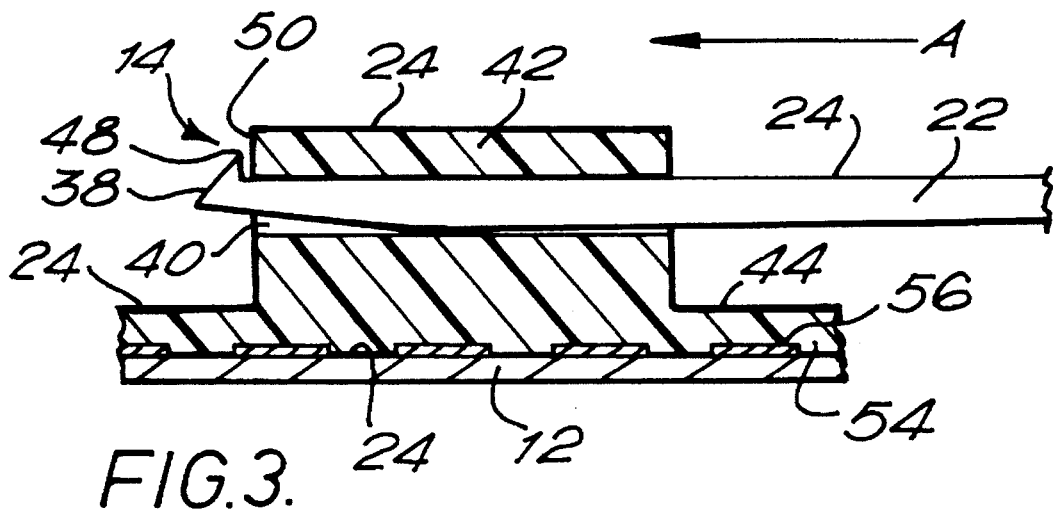
FIG. 3 is a sectional view to an enlarged scale showing the coupling of parts of the static discharger of FIG. 1 one to the other.

With reference now to FIGS. 1 to 3 of the drawings, a static discharger 10 is mounted on the body 12 of an aircraft and is shown to comprise a socket 14 receiving one end 16 of an elongate rod member 18 the other end 20 of which is designed to enhance discharge of electrostatic electricity therefrom.

The rod 18 comprises a body 22 which is moulded from electrically non-conductive moulded polyetherimide (a polymer having an electrical resistivity of $10^{16}$ ohm-meter or greater) but which is provided with a coating layer 24 as shown of lower electrical resistance.

Coating layer 24 is provided from rod 18 by providing a solution of polyetherimide in dichloromethane and adding to it an amount of carbon black. The amount of carbon black added to the polyetherimide in this way is approximately 4% by weight. Subsequent dipping of the rod 18 in the solution allows the build up of the electrically resistive coating—a coating having a specific resistivity greater than $10^2$ ohm-meter and preferably in the range $10^2$–$10^6$ ohm-meter.

The end 20 of rod 18 is provided with a tip member 26 which comprises a plurality of fine carbon or silicon carbide fibres 28 in aligned array in a matrix 30 of polyetherimide— the same high temperature thermoplastics material used to form rod 18. An end of the tip member 26 is in the form of a spigot 32.

To couple the tip member 26 to the rod 18 the spigot 32 is passed into an axially extending aperture 34 in rod 18. Prior to introducing spigot 32 into aperture 34 it is coated with a solution of polyetherimide in dichloromethane such that, as the solvent evaporates, the rod 18 and tip member 26 become integrally combined—solvent welded one to the other as indicated at 36.

The end 16 of the rod 18 is shaped as shown in the form of a taper ending in a hook formation 38.

Rod 18 is coupled to socket 14 by passing the end 16 of the rod in the direction of arrow A through an open bore 40 in a member 42 upstanding from a base plate 44 of socket 14.

When pushing the end 16 of the rod 18 through the bore 40 the leading edge 48 of the hook 38 acts to bias the rod 18 against its natural resilience to permit passage through the bore. Once the hook formation 38 passes out of the open end of the bore 40 the resilience of the rod 18 biases the hook formation 38 upwardly (as viewed in the Figures) to a position in which the trailing edge 48 will abut a shoulder surface 50 of the upstanding member 42 surrounding the end of the bore 40 if the rod is moved against the direction of the arrow A. Thus the hook formation acts to couple the rod 18 and socket 14 together and the contact between the two along the length of the bore 40 provides the desired electrical continuity.

The socket 14 is provided with a further upstanding part 52 spaced from the shoulder surface 50 by an amount permitting the coupling of the rod 18 and socket 14 together and its leading edge is aerodynamically shaped to reduce the resistance to airflow across the static discharger.

The socket 14 is of the same high temperature thermoplastics material used to form the rod body 18 and is again, coated with an electrically resistive coating layer 24.

The surface of the base plate 44 which in use contacts the skin of the aircraft is desirably roughened (i.e. dimpled) as shown at 54 in the FIG. 1C.

The base plate 44 is fixed to the skin of the aircraft making use of a two-part non-solvent adhesive as indicated at 56 which is electrically resistive or is loaded with carbon black to make it so.

If it is desired to remove the rod 18 from the socket 14 for any reason an operative simply presses down on the leading edge 46 of the hook 38 (biasing the rod 18 against its natural resilience) to move the trailing edge 48 out of alignment with the shoulder surface 50 of the upstanding member 42 thereby allowing the rod to be moved against the direction of the arrow A permitting its removal from the socket via bore 40.

The aperture 34 is formed in rod 18 either during the moulding process in which it is made or by being machined therefrom after the rod has been moulded in the whole.

Desirably the rod body 22 is formed from the high temperature thermoplastics material (polyetherimide) by moulding and is provided with the electrically resistive coating 24 by dipping the rod body 22, once it has been formed in a solution of the same high temperature thermoplastics material loaded with carbon black. It will be appreciated that the resistance provided by the coating layer 24 will be a function of the thickness of this coated layer. By repeatedly dipping the rod body into the resin/ carbon black mix it is possible to vary the thickness of the coating such that the rod body may have any desired resistance.

Preferably a number of tip members 26 are formed in one operation by laying up carbon fibers in a mould and then introducing the matrix material and applying heat and pressure to force the matrix material into the interstices of the fibers and form a rod of the desired cross section. After allowing the material to cool the rod which has been formed is cut to length and one end of each part of it is turned or otherwise machined to form the spigot 32. To increase the strength of the tip member 26 a number of carbon fibers may be provided running orthogonally of the its axis.

The socket 14 is again desirably formed in the shape shown by moulding from the same high temperature thermoplastics material (polyetherimide) used to form the rod body 18 and the tip matrix and formed with the electrically resistive coating layer 23 by dipping in a carbon loaded solution of the resin after formation. It is to be noted that this coating layer extends over all the surfaces of the socket 14—both the outer surfaces, the base surface which will be in contact with the aircraft skin and over the inner surfaces of the bore formed to extend through the upstanding part of the socket.

Figure 4:
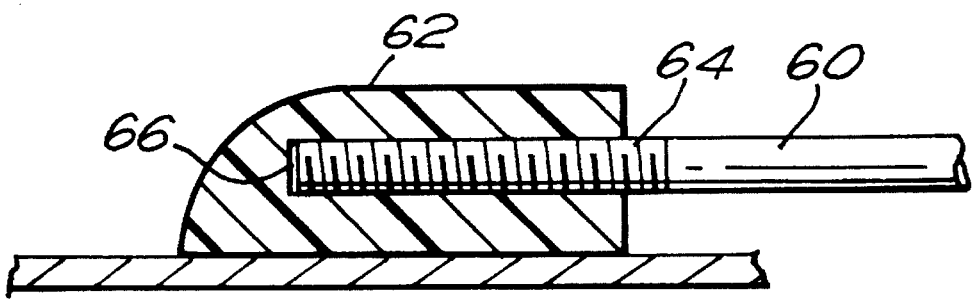
FIG. 4 is a sectional view similar to FIG. 3 of an alternative way of coupling parts of the static discharger together.

FIG. 4 illustrates an alternative way of fixing the rod part of the discharger to the socket part for mounting on the airframe.

In this alternative arrangement the rod 60 is, at its outer end formed in the manner described above and will not further be described. The end of it for attachment to the socket 62, however, is formed with a threaded portion 64 (which may be tapered if desired) adapted to be received in a threaded blind bore 66 in the socket 62. Prior to screwing the portion 64 into bore 66 the surfaces of the threaded portion 64 and/or bore 66 may be coated with an electrically resistive adhesive such as has been described above.

The threaded surfaces of the end of the rod 60 and the bore 66 in socket 62 may be formed in the process by which they are moulded or in the alternative these parts may be moulded in the blank and the necessary threaded parts obtained by machining.

FIGS. 5 and 6 illustrate yet another alternative method of fixing the elongate rod member of the static discharger into the socket 14.

Once again the elongate rod member 70 in FIGS. 5 and 6, has its outer end 20 formed substantially as described above with reference to FIGS. 1 to 3 and will not further be described.

In the arrangements shown in FIGS. 5 and 6 the end 72 of the rod 70 for fixing to the socket 74 comprises two legs 80 which diverge from one another and terminate in respective hook members 82 extending away from the longitudinal axis of the rod 70 as shown.

The socket 74 to which the rod 70 is to be attached is formed from a base plate 86 having lands 88 as before described and to which is solvent-welded a capping member 90. The capping member 90 and base plate 86 are joined as noted, by coating their mating surfaces with a solution of the material from which they are made (polyetherimide) and then held together. As the solvent evaporated the two parts become welded together. The capping member 90 is provided with a generally T-shaped aperture in its surface abutting the base plate 86 such that as formed the socket member is provided with a T-shaped aperture therein as shown. This aperture has a relatively wide stem 92 bounded by side walls 94 and 2 sidearms 96 which extend to the edges of the socket 74 as can be seen. After formation in this way the socket member 74 is provided with an electrically resistive coating by dipping in a solution of polyetherimide loaded with carbon-black as has been described above.

With this alternative a construction of static discharger the dimpled face 88 of the base plate 86 is fixed to the skin of an aircraft making use of an electrically resistive adhesive and once the socket member is firmly in position the elongate rod member 70 may be coupled to it in the following way. First the outer ends 98 of the hooks 82 are pressed inwardly towards the axis 84 of the rod 70 against the natural resilience of the polyetherimide material from which the rod is moulded.

It will be seen that these two ends may be sufficiently compressed such that the ends 72 of the rod 70 can be passed into the wide stem portion 92 of the aperture in the socket. Thereafter by pushing the rod 70 in the direction of the arrow A the hooks 82 will pass along the stem 92 until they reach a position as which, due to the natural resilience of the material from which they are made, the hooks will pass into the side arms 96 of the aperture.

It will be noted that the edges 100 of the legs 80 are shaped such that there is a surface contact between the legs 80 and the walls 94 of the bore 92 in which the end 72 of rod 70 is received in use.

If it is desired to remove the rod 70 from the socket 74 it will be appreciated that the ends 98 of the hooks may be compressed—through the open ended side arms 96 to an extent enabling the hooks 82 to be withdrawn along the wide stem portion 92 of the aperture in the socket.

It will be appreciated from all the various arrangements as described above that the electrical continuity of the discharger—from the skin of an aircraft on which it is mounted to the discharger tip is made by resistive elements. In particular this continuity is effective through first the resistive adhesive mounting the socket member on the aircraft skin, across the resistive coating of the socket member and along the resistive coating of the rod until the rod tip is reached.

Thus in a static discharger embodying the present invention there is no metal or other electrically, highly, conductive portion.

It will further be appreciated from the foregoing description that the resistance of the various parts of the discharger may be altered. The resistance of the tip member may be altered by varying the number of carbon fibers laid up within the mould prior to moulding the tip member. Resistance of the elongate rod member and the socket member can be altered by varying the thickness of the coating which is placed on them. As noted above this thickness variation may be effected by repeatedly dipping the rod and/or socket member in a solution of the polyetherimide material loaded with carbon black until the desired thickness of coating (and therefore resistance) has been achieved. Finally it will be appreciated that the resistance of the adhesive coupling between the socket member and the skin of an aircraft on which the discharger is mounted may be altered by varying the loading of carbon black mixed in with the adhesive.

Experiment has shown that it is desirable for the various parts of the static discharger now described to have different resistances and the preferred range of resistances for each of the parts is as follows:—the resistance of the adhesive coupling between aircraft skin and socket base is in the range 5–10K ohms; the resistance of the attachment socket is in the range 5–10M ohms; the resistance of the elongate member is in the range 20–100M ohms; and the resistance of the tip is in the range 2–5 ohms.

Additionally if desired, it is possible to vary the resistance of, for example, the rod along its length by selectively dipping parts of the rod one or more times in a solution of the polymer material loaded with carbon black. In this way, if thought desirable, it is possible to vary the resistance of the rod such that it has, for example, a higher resistance towards the tip end than it does towards the socket end in use.

The described arrangements have many advantages over the known forms of static discharger. For example the particular form of tip now proposed provides an advanced high temperature thermoplastics material matrix with a relatively high melt temperature supporting a large number of fine points with the result that the tip has a low corona inception voltage (with the result that electrostatic charges in the air-frame are rapidly dissipated).

The rod 18 and socket 14 are of the same high temperature thermoplastics material but have a predetermined electrical resistance which moreover is variable along the length of the rod and across the body of the socket to enable the most effective current flow rate to be achieved to reduce pulse sparking and thereby reduce R.F. noise generation to a minimum.

The static discharger is mounted on the air-frame with use of adhesives thereby providing that the static discharger includes no metal parts which in the event of lightning strike would cause failure of the static discharger.

It is to be noted that in the event of lightning strike adjacent to a static discharger the lightning will not be attracted to the tip of the static discharger. The totally electrically resistive nature of the static dischargers now proposed means that any lightning strike attaching to them will not track along the length of the static discharger to the air-frame.

Again the use of adhesive to fix the static discharger to air-frame removes the need to use rivets or screws which may be points at which lightning strikes the air-frame leading to loss or damage to the static discharger, and which in any event are invasive and puncture the skin of the aircraft.

Although described above as being moulded from polyetherimide it will be appreciated that other high temperature thermoplastics material may be used—for example polyethersulphone, and polyetheretherketone may be used. Additionally other electrically non conductive plastics materials which have suitable strength and weather resistance characteristics may be used to form the static dischargers now described.

The use of high temperature thermoplastics materials to make the static discharger now proposed means that both the weight and drag of the static dischargers are reduced compared with currently available static dischargers incorporating metal in their manufacture. Another advantage of using high temperature thermoplastics materials is that the inherent flexibility of the static dischargers means that ground handling damage thereto will be reduced.

It will be appreciated that many variations may be made to the described arrangements without departing from the scope of the invention For example the form and materials used to make the tip, rod and socket forming the static discharger may be varied from those described and any material having suitable strength, resilience and electrical resistance characteristics may be used.

If desired the high temperature thermoplastics material used to form the parts of the static discharger may be reinforced with appropriate fibers reinforcement which extend to the end of the rod and form the tip thereof.

It is envisaged that the socket may be omitted and the rod member 18, 60 or 70 coupled directly to the air-frame (mechanically and/or adhesively) if the skin of the aircraft is suitably shaped to receive the end of the rod. It will be appreciated that the rod member now described may be used to retro-fit existing static dischargers providing the socket therein will receive the end of the rod member now provided.

If desired the electrical resistance of the rod and socket (if provided) may be provided by loading the high temperature thermoplastics material with carbon or other suitably electrically resistive material prior to forming those parts.

Other means of attaching the tip to the rod (if formed separately) may be utilised if desired providing the electrical resistance of the joint between the two is appropriately controlled. Again, the rod and socket member may be differently shaped to permit other methods to be used to enable their attachment one to the other.

I claim:

1. Apparatus for discharging static electricity from an aircraft, comprising an elongate member formed of molded high temperature thermoplastics material free of any metallic material, said elongate member having a first end shaped and adapted for coupling to the surface of the aircraft and a second end provided with a tip member from which the electrostatic charge built up on the aircraft is discharged, said elongate member being covered with an electrically resistive coating, said tip member being formed of the same high temperature thermoplastics material as said elongate member and incorporating an aligned array of fibers, each fiber terminating in a fine point, and the material of the elongate member, the tip member, and the couple being selected so that their combined electrical resistivity is equal to or greater than $10^2$ ohmmeter, the high temperature thermoplastics material of the tip member, elongate member and attachment socket being selected from the group comprising polyetherimide, polyethersulphone and polyetheretherketone.

2. The apparatus as claimed in claim 1, wherein the resistance of the adhesive used to mount the attachment socket on the aircraft is in the range 5–10K ohms; the resistance of the attachment socket is in the range 5–10M ohms; the resistance of the elongate member is in the range 20–100M ohms; and the resistance of the tip is in the range 2–5 ohms.

3. The apparatus as claimed in claim 2, wherein the attachment socket is provided with a bore in which said first end of the elongate member is received and fixed to hold the elongate member in use.

4. The apparatus as claimed in claim 3, wherein the elongate member is resilient and the first end thereof is in the form of a hook, the elongate member being shaped and sized such that said first end thereof may be passed from one end to the other of the said bore to a position at which said hook member engages a surface of the attachment socket adjacent said other end of the bore to retain the elongate member in position.

5. The apparatus as claimed in claim 4, wherein the bore of the attachment socket is open and is provided in a first part of the socket upstanding from a base plate of the socket the socket being provided with a further upstanding part spaced from the said one other of the open bore by an amount permitting the fixing of the elongate member to the socket, the further upstanding part being shaped to decrease the resistance of airflow across the static discharger.

6. The apparatus as claimed in claim 2, wherein the elongate member is resilient and the first end thereof is in the form of two hook members, the elongate member being shaped and sized such that said first end thereof may be passed from one end to the other of the said bore to a position at which each hook member engages a respective surface of the attachment socket adjacent said other end of the bore to retain the elongate member in position.

7. The apparatus as claimed in claim 6, wherein the bore of the attachment socket is provided in a part of the socket upstanding from a base plate of the socket and terminates in a cavity within the attachment socket and which in use receives each hook member.

8. The apparatus as claimed in claim 7, wherein said cavity comprises a further bore running orthogonally of the first said bore such as to enable access to be made to at least one of said hook members of the first end of the elongate member to enable the release of the elongate member from the attachment socket.

9. Apparatus for discharging static electricity from an aircraft, comprising an elongate member formed of molded high temperature thermoplastics material free of any metallic material, said elongate member having a first end shaped and adapted for coupling to the surface of the aircraft and a second end provided with a tip member from which the electrostatic charge built up on the aircraft is discharged, said elongate member being covered with an electrically resistive coating, said tip member being formed of the same high temperature thermoplastics material as said elongate member and incorporating an aligned array of fibers, each fiber terminating in a fine point, and the material of the elongate member, the tip member, and the couple being selected so that their combined electrical resistivity is equal to or greater than $10^2$ ohmmeter, said couple comprising an attachment socket adapted for adhesive mounting on the surface of the aircraft, the attachment socket being of the same high temperature thermoplastics material as the elongate member and has electrical resistive coating, the first end of the elongate member being shaped and adapted for coupling to said attachment socket, and the electrical resistivity of said socket being equal or greater than $10^2$ ohmmeter.

10. Apparatus for discharging static electricity from an aircraft, comprising an elongate member formed of molded high temperature thermoplastics material free of any metallic material, said elongate member having a first end shaped and adapted for coupling to the surface of the aircraft and a second end provided with a tip member from which the electrostatic charge built up on the aircraft is discharged, said elongate member being covered with an electrically resistive coating, said tip member being formed of the same high temperature thermoplastics material as said elongate member and incorporating an aligned array of fibers, each fiber terminating in a fine point, and the material of the elongate member, the tip member, and the couple being selected so that their combined electrical resistivity is equal to or greater than $10^2$ ohmmeter, the high temperature thermoplastics material of the elongate member and the tip member having an electrical resistivity equal to or greater than $10^{16}$ ohmmeter and the material of the tip member having embedded therein a plurality of fine carbon or silicon carbide fibers in an aligned array.

11. The apparatus as claimed in claim 9, wherein the high temperature thermoplastics material of the elongate member, the attachment socket and the tip member has an electrical resistivity equal to or greater than $10^{16}$ ohmmeter and wherein the material of the tip member has embedded therein a plurality of fine carbon or silicon carbide fibers in an aligned array.

12. The apparatus as claimed in claim 9, wherein said elongate member and said attachment socket are coated with the same thermoplastics material with 4% by weight carbon black.

* * * * *